(12) United States Patent
Kawasaki et al.

(10) Patent No.: US 6,220,207 B1
(45) Date of Patent: Apr. 24, 2001

(54) ENGINE COOLING APPARATUS (75) Inventors: Koji Kawasaki, Tsuchiura; Shigehisa Funabashi, Ibaraki-ken; Zenji Kaneko, Tsukuba; Masaki Kanahara, Ibaraki-ken; Koji Tahara, Shimodate, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/077,937

(22) PCT Filed: Oct. 8, 1997

(86) PCT No.: PCT/JP97/03598

§ 371 Date: Jun. 4, 1998

§ 102(e) Date: Jun. 4, 1998

(87) PCT Pub. No.: WO98/16727

PCT Pub. Date: Apr. 23, 1998

(30) Foreign Application Priority Data

Oct. 11, 1996 (JP) .................................................... 8-269683

(51) Int. Cl.$^7$ ........................................................ F01P 7/02
(52) U.S. Cl. ..................................... 123/41.11; 123/41.49
(58) Field of Search ............................... 123/41.11, 41.49; 416/189; 415/58.2, 58.3, 58.4; 165/125

(56) References Cited

U.S. PATENT DOCUMENTS

| 3,621,822 | * | 11/1971 | Oster | 123/41.11 |
| 4,181,172 | * | 1/1980 | Longhouse | 123/41.49 |
| 4,202,296 | * | 5/1980 | Nonnenmann | 123/41.49 |
| 4,213,426 | * | 7/1980 | Longhouse | 123/41.49 |
| 5,024,267 | * | 6/1991 | Yamaguchi et al. | 123/41.49 |
| 5,839,397 | * | 11/1998 | Funabashi et al. | 123/41.49 |

FOREIGN PATENT DOCUMENTS

| 4-34098 | 10/1979 | (JP) . |
| 56-70117 | 11/1979 | (JP) . |
| 2-123221 | 5/1990 | (JP) . |
| 2-64799 | 5/1990 | (JP) . |
| 3-117616 | 5/1991 | (JP) . |
| 4-269326 | 9/1992 | (JP) . |
| 5-248239 | 9/1993 | (JP) . |
| 5-248241 | 9/1993 | (JP) . |
| 5-288053 | 11/1993 | (JP) . |
| 7-77044 | 3/1995 | (JP) . |
| 8-303241 | 11/1996 | (JP) . |

* cited by examiner

Primary Examiner—Marguerite McMahon
Assistant Examiner—Jason Benton
(74) Attorney, Agent, or Firm—Mattingly, Stanger & Malur

(57) ABSTRACT

In an engine cooling system which includes an intercooler for precooling combustion air supplied to an engine, an oil cooler for cooling a hydraulic working fluid for use in a hydraulic excavator, a radiator for cooling cooling water supplied to the engine, a cooling fan in the form of a centrifugal fan, and a suction duct for introducing the cooling air to the suction side of the cooling fan, an opening diameter of a suction duct downstream end is smaller than an opening diameter of a rotary shroud suction-side end, and the suction duct downstream end is positioned inside the rotary shroud suction-side end in overlapped relation.

3 Claims, 6 Drawing Sheets

FIG.4A  SUCTION DUCT DOWNSTREAM END POSITIONED ON INNER SIDE

FIG.4B  SUCTION DUCT DOWNSTREAM END POSITIONED ON OUTER SIDE

ENGINE COOLING APPARATUS

TECHNICAL FIELD

1. Field of the Invention

The present invention relates to an engine cooling system, and more particularly to an engine cooling system mounted on construction machines.

2. Description of the Related Art

Of known art concerned with engine cooling system of the above-mentioned type, several conventional examples employing centrifugal fans are discussed below.

(1) "Internal Combustion Engine", Vol. 31, No. 388, p. 9–27 (1992)

This known art intends to improve a cooling ability by using a centrifugal fan as a fan to supply cooling air in an engine cooling section of a construction machine, and to reduce noise of engine sound by separating an engine room and a cooling system section from each other.

(2) JP, A, 5-248239

This known art intends to improve a cooling ability by using a centrifugal fan as a fan to supply cooling air in an engine cooling section of a working vehicle such as a tractor.

(3) JP, U, 2-64799

This known art intends to eliminate a discharge duct, which has been required when using an axial fan, by using a centrifugal fan as a fan to supply cooling air in an engine cooling section of an automobile.

On the other hand, as known art concerned with engine cooling systems employing axial fans, there is an example set forth below.

(4) JP, A, 5-288053

According to this known art, in an engine cooling system for a hydraulic excavator, cooling air is supplied to a heat exchanger by an axial fan coupled to an engine crankshaft through a fan belt. Though not stated in detail in the Publication disclosing this known art, the engine cooling system has a structure, by way of example, as shown in FIG. 8.

Figure 8:
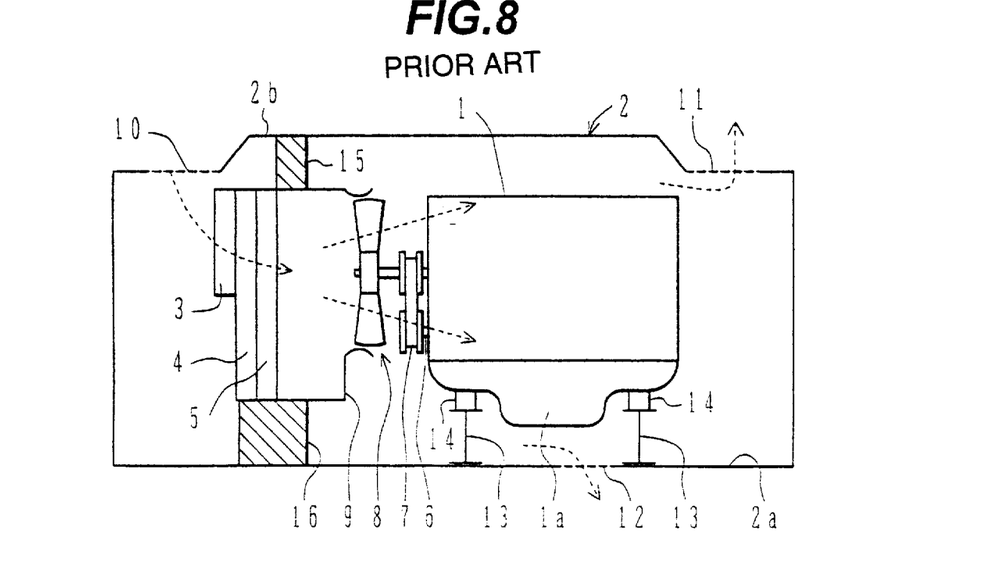
FIG. 8 is a side sectional view showing a structure of a conventional engine cooling system.

In FIG. 8, an engine cooling system is provided in an engine room 2 housing an engine 1 installed therein, and comprises an intercooler 3 for precooling combustion air supplied to the engine 1, an oil cooler 4 for cooling a hydraulic working fluid for use in a hydraulic excavator, a radiator 5 for cooling cooling water supplied to the engine 1, a cooling fan 8 in the form of an axial fan driven by a fan belt 7 to which power is transmitted from the crankshaft 6 of the engine 1, and a suction duct 9 for introducing the cooling air to the suction side of the cooling fan 8.

The cooling air enters the engine room 2 through a cooling air inlet port 10 from the outside of the engine room 2, and is restricted by the suction duct 9 after passing the intercooler 3, the oil cooler 4 and the radiator 5 which are each a heat exchanger, followed by reaching the cooling fan 8. After being blown out axially to the downstream side of the cooling fan 8, the cooling air flows around the engine 1 and an oil pan 1a below the engine 1 while cooling them, and is then discharged to the outside through cooling air outlet ports 11, 12 disposed respectively in upper and lower portions of the engine room 2. Additionally, the engine 1 is installed on a frame 13, which is provided on a bottom surface 2a of the engine room 2, through vibration damping devices 14, and partition members 15, 16 are disposed so as to provide sealing between the suction duct 9 and an upper cover 2b and the bottom surface 2a of the engine room 2.

Further, as known art concerned with engine cooling system employing obliquely axial fans, there is an example set forth below.

(5) JP, A, 4-269326

This known art is to achieve a higher pressure and a higher flow rate than obtainable with an axial fan by using an obliquely axial fan as a fan to supply cooling air in a cooling section of a diesel engine for vehicles, and by simultaneously forming a fixed shroud for introducing the cooling air in the shape of a suction duct.

Recently, there has been a tendency that resistance of a cooling flow passage in an engine room is increased due to the provision of an intercooler, a demand for improved enclosing of the engine room for noise reduction, and a demand for a more compact structure of the engine room. Because a comparable flow rate to a conventional device is demanded in spite of such a tendency, a cooling fan is required to provide a larger flow rate and a higher pressure.

Responding to those needs, in the known arts (1) to (3), a centrifugal fan capable of providing a larger flow rate and a higher pressure than an axial fan on condition the of having the same outer diameter and the same revolution speed under action of centrifugal forces is employed as the cooling fan in place of the axial fan which has been hitherto usually employed. In a centrifugal fan, cooling air is introduced to a impeller axially from a suction duct and blown out radially upon rotation of the vane wheel, but on that occasion there occurs a leakage of the cooling air in the radial direction through gaps between the suction duct and vanes. This increases loss and hence raises the problem that the fan efficiency expressed by (flow rate×pressure)/(power input to fan rotary shaft) is lowered and noise is increased.

Further, in the known arts (4) and (5), the use of an axial fan or an oblique axial fan makes it difficult to achieve a sufficient increase in flow rate and pressure. Accordingly, there has been a problem that when trying to ensure the same flow rate as usual under a condition where the resistance of the cooling flow passage in the engine room is increased for the above-mentioned reason, the revolution speed must be raised; hence noise is increased. Additionally, in the known art (5), because an air flow having passed the axial fan flows in such a direction as to strike against the engine, a pressure loss is increased and a reverse flow of the cooling air occurs around the engine and the oil pan in some cases. For these reasons, it is hard to ensure a sufficient flow rate of the cooling air. As a result, the revolution speed must be further raised from the standpoint of ensuring a sufficient flow rate of the cooling air; hence noise is increased.

To solve the problems stated above, the inventors of this application have proposed, in Japanese Patent Application No. 7-109483 (filed May 8, 1995), an engine cooling system comprising at least one heat exchanger provided in an engine room housing an engine installed therein, and including a radiator to cool cooling water supplied to the engine, a fan for cooling the heat exchanger, and a suction duct provided upstream of the fan and introducing the cooling air to the suction side of the fan, wherein the cooling fan is one of a mixed flow fan or a centrifugal fan, and includes an impeller provided with a plurality of vanes, and a rotary shroud fixed to the impeller and rotated together with the vane wheel.

In the proposed engine cooling system, however, the relationship in arrangement between the rotary shroud and the suction duct is not specified. There is disclosed such a structure that a suction-side end of the rotary shroud is positioned on the outer side and a downstream end of the suction duct is positioned on the inner side, and a structure that the suction-side end of the rotary shroud is positioned on the inner side and the downstream end of the suction duct is positioned on the outer side. The engine cooling system having the above structure accompanies another problem below.

In general, a largest part of the noise generated by the cooling system of the above-mentioned type is from the impeller of the cooling fan, and a largest part of the noise generated from the impeller is from front edges of vanes (inlet of vane). When the downstream end of the suction duct is positioned outside the suction-side end of the rotary shroud, the direction of a gap flow coming in through radial gaps between the suction duct and the rotary shroud is opposed to the direction of a main flow of cooling air coming in from the suction duct to the rotary shroud, and the flow of the cooling air is greatly disturbed due to eddies or the like in a joining area of both the gap flow and the main flow. A turbulent flow thus generated increases noise, in particular, at the vane front edges of the vane wheel. Further, in the above arrangement, to avoid contact between the suction duct and the rotary shroud in connection with the problem of vibration during work, the axial distance between the suction duct and the rotary shroud must be set long; hence it is difficult to meet the above-mentioned demand for a more compact engine room.

SUMMARY OF THE INVENTION

The present invention has been made to solve the various problems set forth above, and its object is to provide an engine cooling system which can produce cooling air at a large flow rate and a high pressure and can realize a reduction in noise and size without lowering the fan efficiency.

To achieve the above object, according to the present invention, in an engine cooling system comprising at least one heat exchanger provided in an engine room housing an engine installed therein, and including a radiator to cool cooling water supplied to the engine, a cooling fan for inducing cooling air to cool the heat exchanger, and a suction duct provided upstream of the cooling fan and introducing the, cooling air to the suction side of the cooling fan. The cooling fan is one of a mixed flow fan and a centrifugal fan, and includes an impeller provided with a plurality of vanes, and a rotary shroud fixed to the impeller and rotated together with the vane wheel. The suction duct has a downstream end with an opening diameter smaller than an opening diameter at a suction-side end of the rotary shroud, is being arranged such that the downstream end is positioned inside the suction-side end of the rotary shroud in overlapped relation.

Specifically, in the present invention, a mixed flow fan or a centrifugal fan is used as a fan. These fans can provide a larger flow rate and a higher pressure than an axial fan or an obliquely axial fan on the condition of having the same outer diameter and the same revolution speed under action of centrifugal forces. Accordingly, when designing an engine cooling system with a larger flow rate and a higher pressure to ensure a comparable flow that of a conventional device in a recent engine room where a cooling flow passage has increased resistance, noise can be reduced without increasing the revolution speed, unlike the case of using an axial fan or an oblique axial fan. In this connection, since the rotary shroud rotating together with the impeller is fixed to the vane wheel, cooling air is prevented from leaking radially through gaps between the suction duct and the vanes; hence the fan efficiency can be improved. As a result, noise can be further reduced correspondingly.

Also, by arranging the downstream end of the suction duct to a position inside the suction-side end of the rotary shroud in overlapped relation, the direction of a gap flow coming in through radial gaps between the suction duct and the rotary shroud is the same as the direction of a main flow of the cooling air. With this arrangement, the flow of the cooling air can be kept from being disturbed due to eddies or the like that are generated in the case of arranging the suction duct at a position outside the rotary shroud, and noise can be reduced correspondingly. In addition, with the arrangement that the downstream end of the suction duct is positioned inside the suction-side end of the rotary shroud in overlapped relation, the suction duct and the rotary shroud can be arranged closer to each other than the case of arranging the suction duct to position outside the rotary shroud on condition that a distance between the suction duct and the impeller in the axial direction of the fan is set to the same value. As a result, an engine room can be made more compact correspondingly.

In the above engine cooling system, preferably, an overlap amount between the downstream end of the suction duct and the suction-side end of the rotary shroud in the axial direction is not less than 0 mm, but not more than 40 mm.

The reason is as follows. Setting the overlap amount to be not less than 0 mm, i.e., not negative, makes it possible to avoid such problems that the downstream end of the suction duct and the suction-side end of the rotary shroud are separated from each other, thus increasing an amount of air sucked from the outside of the suction duct and lowering the fan efficiency, and a more compact engine room is difficult to realize. Conversely, if the overlap amount is too large, the suction duct and the rotary shroud are so close to each other and a distance from a joining position of the gap flow coming in through radial gaps between the suction duct and the rotary shroud and the main flow of the cooling air to a vane front edge of the impeller of the cooling fan is so short that flow disturbance caused upon joining of both the gap flow and the main flow adversely affects the performance of the cooling fan, thereby lowering the fan efficiency and increasing noise. With the above in mind, the overlap amount is optimally about 20 mm. In a case where the present invention is applied to construction machines such as hydraulic excavators, however, it is required to consider manufacturing tolerances and assembly errors because construction machines are each a large welded structure as a whole. In addition, it is also required to avoid contact between the suction duct and the rotary shroud even under vibration which occurs during work. In view of those points, an appropriate upper limit of the overlap amount is about 40 mm.

In the above engine cooling system, preferably, assuming that a radial clearance between the downstream end of the suction duct and the suction-side end of the rotary shroud is C and a maximum diameter of the impeller is Do, the relation of $C \leq 0.05 \times Do$ is satisfied.

Specifically, if the clearance C is too large in comparison with the maximum diameter Do of the vane wheel, a proportion of the gap flow joining with the main flow of the cooling air is increased and the efficiency of the cooling fan is lowered. In other words, the smaller the clearance C, the higher is the fan efficiency. However, manufacturing tolerances, assembly errors and vibration have to be taken into consideration as with the setting of the clearance C stated above. Thus, an appropriate upper limit of the clearance C is $C=0.05 \times Do$.

In the above engine cooling system, preferably, the suction duct comprises a substantially box-shaped introducing plate and a ring member being substantially in the form of a circular tube and integrally formed on a rear wall of the introducing plate.

Specifically, it is desired that the suction duct has such a form as defining a flow passage shape to be as smooth as possible and causing no pressure loss. In order to obtain the smooth flow passage shape and improve the production efficiency, the suction duct is usually manufactured by, e.g., pressing using a die. The pressing method is effective in high-volume production, but it pushes up a cost in low-volume production because a die is relatively expensive. In the case of low-volume production, therefore, the suction duct is modified to have such a simpler structure that the ring member is attached to a rear wall of a substantially box-shaped introducing plate. This structure eliminates the need of a die and enables the suction duct to be manufactured at a reduced cost correspondingly.

DESCRIPTION OF THE PREFERRED EMBODIMENTS

Hereunder, an embodiment of an engine cooling system of the present invention will be described below in conjunction with the drawings.

One embodiment of the present invention will be described below with reference to the drawings.

Figure 1:
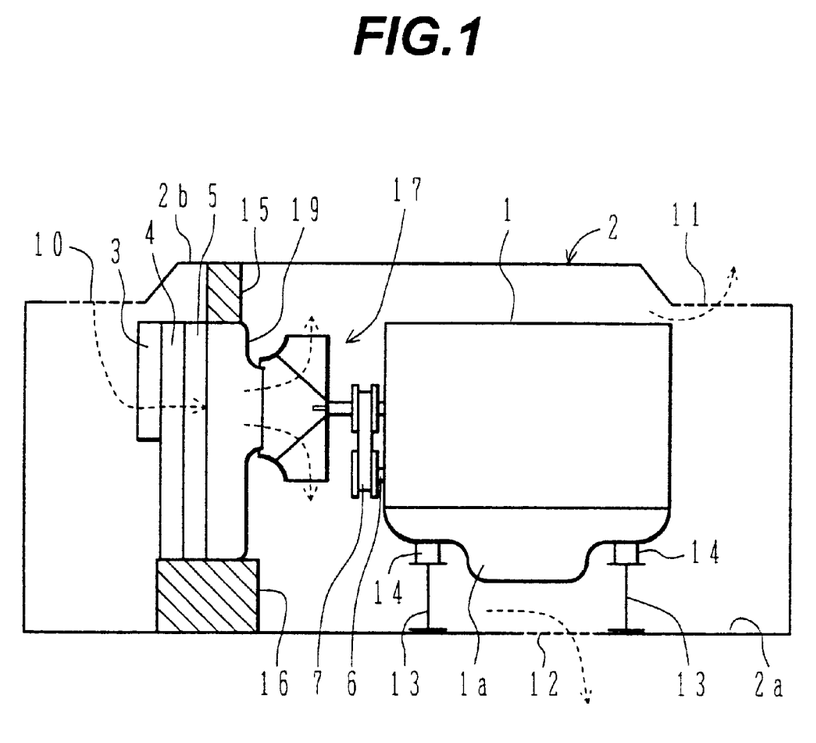
FIG. 1 is a side sectional view showing a structure of an engine cooling system according to one embodiment of the present invention.

FIG. 1 shows a structure of an engine cooling system according to this embodiment. It is to be noted that equivalent members to those in FIG. 8, which has been referred to above to explain the conventional structure, are denoted by the same reference numerals and are not explained here. Referring to FIG. 1, the structure of the engine cooling system according to this embodiment differs from the conventional structure shown in FIG. 8, particularly, in the type of a cooling fan 17, arrangement of a rotary shroud 18, and shape of a suction duct 19. A detailed arrangement of the cooling fan 17 and the suction duct 19 is shown in FIG. 2.

Figure 2:
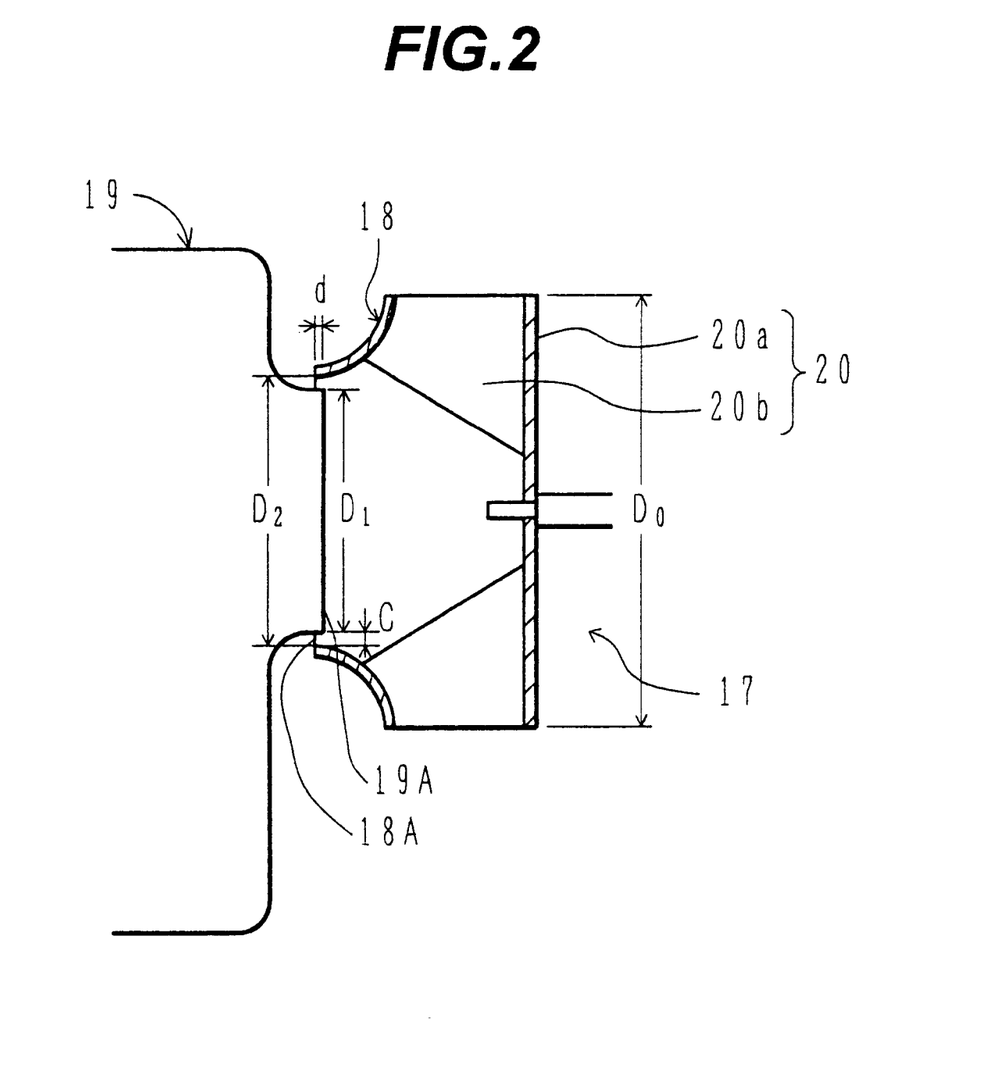
FIG. 2 is an enlarged side sectional view showing a detailed arrangement of a cooling fan and a suction duct.

Referring to FIGS. 1 and 2, the cooling fan 17 is a centrifugal fan comprising a impeller 20 provided with a center plate 20a and a plurality of vanes 20b, and a rotary shroud 18 fixed to the impeller 20 and rotated together with the impeller 20. The suction duct 19 has a downstream end 19A with an opening diameter D1 smaller than an opening diameter D2 at a suction-side end 18A of the rotary shroud 18, and is arranged such that the suction duct downstream end 19A is positioned inside the rotary shroud suction-side end 18A in overlapped relation. Also, an overlap amount between the suction duct downstream end 19A and the rotary shroud suction-side end 18A in the axial direction is d=20 mm. Given a maximum diameter of the impeller 20 (diameter of the center plate 20a in this embodiment) being Do, a radial clearance C between the suction duct downstream end 19A and the rotary shroud suction-side end 18A is given by C=0.03×Do. The suction duct 19 is manufactured by, e.g., pressing using a die in order to not only provide the suction duct 19 with such a form defining a smooth flow passage shape and causing no pressure loss, but also to improve the production efficiency.

In the above structure, similarly to that shown in FIG. 8, cooling air enters an engine room 2 through a cooling air inlet port 10 from the outside of the engine room 2, and after passing an intercooler 3, an oil cooler 4 and a radiator 5 which are each a heat exchanger, is introduced by the suction duct 19 to the cooling fan 17 comprising a centrifugal fan. After being blown out from a circumference of the cooling fan 17, the cooling air flows around an engine 1 and an oil pan 1a below the engine 1 while cooling them, and is then discharged to the outside through cooling air outlet ports 11, 12 disposed respectively in upper and lower portions of the engine room 2.

Actions and effects of the present invention constructed as explained above will be described below one by one.

(A) Actions and Effects Based on Centrifugal Fan and Rotary Shroud

First, in the engine cooling system of this embodiment, a centrifugal fan is used as the cooling fan 17. The use a centrifugal fan makes it possible to achieve a larger flow rate and a higher pressure than obtainable with a conventional structure using an axial fan or an obliquely axial fan on the condition of having the same outer diameter and the same revolution speed. This point will be described with reference to FIG. 3.

Figure 3:
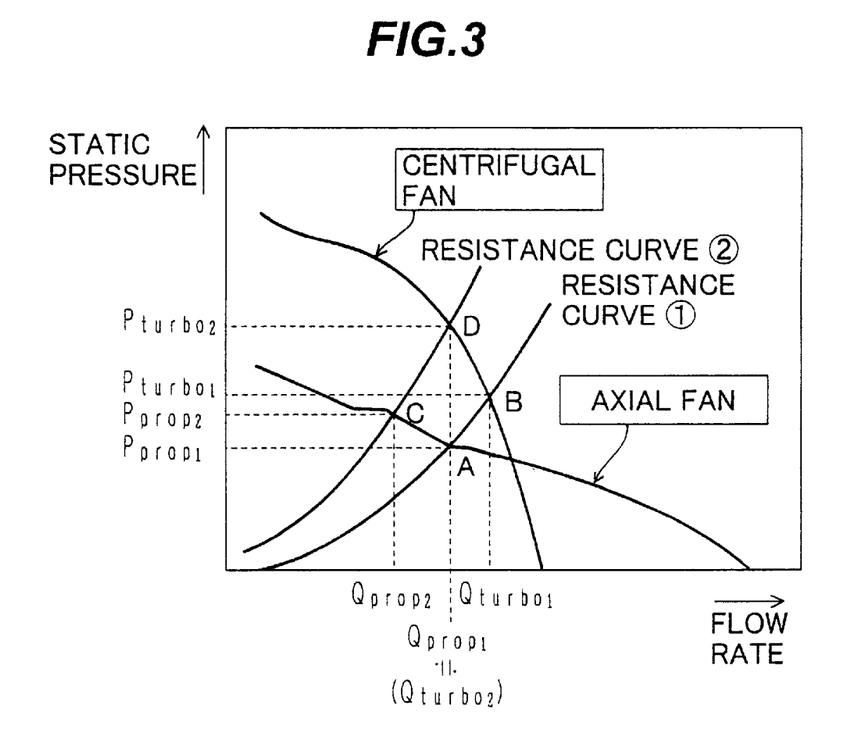
FIG. 3 is a graph comparatively showing fan characteristics of an axial fan and a centrifugal fan on the condition of having the same revolution speed and the same outer diameter.

FIG. 3 is a graph comparatively showing, by way of example, fan characteristics of an axial fan and a centrifugal fan on the condition of having the same revolution speed and the same outer diameter. In the graph of FIG. 3, the horizontal axis represents a flow rate and the vertical axis represents a static pressure. Characteristics curves of "axial fan" and "centrifugal fan" each indicate respectively a characteristic of a single axial fan alone and a single centrifugal fan alone (i.e., a characteristic of each fan alone measured without arranging it in a flow passage). Two resistance curves (1), (2) each indicate a characteristic of the cooling flow passage alone in the engine room (i.e, a characteristic uniquely determined by the flow passage structure). The cross points between the fan characteristic curves and resistance curves each imply an operating point effective when one of the fans is arranged in one of the flow passages, and represent a pressure and flow rate resulted in that case. Note that, of the resistance curves (1), (2), the resistance curve (1) indicates a characteristic of the cooling flow passage in the conventional engine room, and the resistance curve (2) indicates a characteristic of the cooling flow passage in the recent engine room adapted for the provision of an intercooler, a demand for improved enclosing of the engine room for noise reduction, and a demand for more compact structure of the engine room.

First, when the axial fan is arranged in the conventional engine room, the resulting flow rate and static pressure are given by a cross point A between the characteristic curve of "axial fan" and the resistance curve (1), i.e., Qprop1 and Pprop1, respectively. On the other hand, when the centrifugal fan is arranged in the conventional engine room, the resulting flow rate and static pressure are given by a cross point B between the characteristic curve of "centrifugal fan" and the resistance curve (1), i.e., Qturbo1 and Pturbo1, respectively. Thus, the centrifugal fan has a property capable of providing a higher pressure and a larger flow rate than the axial fan on the condition of having the same outer diameter and the same revolution speed under action of centrifugal forces (described later in more detail).

Next, if the conventional axial fan is arranged as it is in the recent engine room, the resulting flow rate and static pressure are given by a cross point C between the characteristic curve of "axial fan" and the resistance curve (2), i.e., Qprop2 and Pprop2, respectively. The static pressure Pprop2 is larger than the above Pprop1 resulted when arranging the axial fan in the conventional engine room, thus embalming a higher pressure to be achieved, but the flow rate Qprop2 is smaller than the above Qprop1 resulted when arranging the axial fan in the conventional engine room. Accordingly, in order to achieve a comparable flow rate to the conventional Qprop1, the revolution speed must be increased, which results in a remarkable increase of noise. On the other hand, when the centrifugal fan is arranged in the recent engine room, the resulting flow rate and static pressure are given by a cross point D between the characteristic curve of "centrifugal fan" and the resistance curve (2), i.e., Qturbo2 (Qprop1) and Pturbo2, respectively. Thus, a flow rate almost equal to the flow rate Qprop1 resulted when arranging the axial fan in the conventional engine room can be ensured, and a higher pressure twice or that more of the static pressure Pprop1 resulted when arranging the axial fan in the conventional engine room can be achieved.

Such characteristics of the centrifugal fan can be explained as follows.

Generally, a theoretical pressure rise Pth of a fan is expressed by the following formula:

$Pth=P(u_2^2-u_1^2)/2+P(v_2^2-v_1^2)/2+P(w_2^2-w_1^2)/2$ where u is a circumferential speed of the fan, v is an absolute speed of a flow, w is a relative speed of the flow, and suffixes 1, 2 represent that corresponding parameters indicate values at an inlet and outlet of the fan, respectively.

In the above formula, the first term $P(u_2^2-u_1^2)/2$ of the right member represents an effect of centrifugal forces, the second term $P(v_2^2-v_1^2)/2$ of the right member represents a change in kinetic energy (i.e., a rise in dynamic pressure), and the third term $P(w_2^2-w_1^2)/2$ of the right member represents an effect due to deceleration in the flow passage (i.e., a rise in static pressure). Considering now the first term, since the inlet and outlet of the axial fan have the same diameter, $u_1=u_2$ holds and the first term=0 is resulted. On the other hand, since the outlet of the centrifugal fan has a lager diameter than the inlet thereof, the effect of centrifugal forces based on the second term is maximally developed. As compared with the axial fan, therefore, the centrifugal fan can achieve a higher pressure and hence a larger flow rate more easily. Note that while the characteristics of the centrifugal fan have been explained above in comparison with the axial fan, the above explanation is also equally applied to comparison with an obliquely axial fan.

By using a centrifugal fan as the cooling fan 17, as stated above, it is possible to provide a higher pressure and a larger flow rate than using an axial fan or an obliquely axial fan on the condition of having the same outer diameter and the same revolution speed. Accordingly, when designing an engine cooling system with a larger flow rate and a higher pressure to ensure a comparable flow rate to that of a conventional device in the recent engine room where the cooling flow passage has increased resistance, noise can be reduced without increasing the revolution speed, unlike the case of using an axial fan or an obliquely axial fan. Further, in the cooling fan 17, since the rotary shroud 18 rotating together with the impeller 20 is fixed to the impeller 20, cooling air is prevented from leaking radially through gaps between the suction duct 19 and the vanes 20b; hence the fan efficiency can be improved. As a result, noise can be further reduced correspondingly.

(B) Actions and Effects Based on Positional Relationship Between Suction Duct and Rotary Shroud In the cooling system of this embodiment, since the suction duct downstream end 19A is positioned inside the rotary shroud suction-side end 18A in overlapped relation, noise can be held down as compared with the case where the suction duct downstream end 19A is positioned outside the rotary shroud suction-side end 18A. This point will be described with reference to FIGS. 4A, 4B, 5 and 6.

Figure 4A:
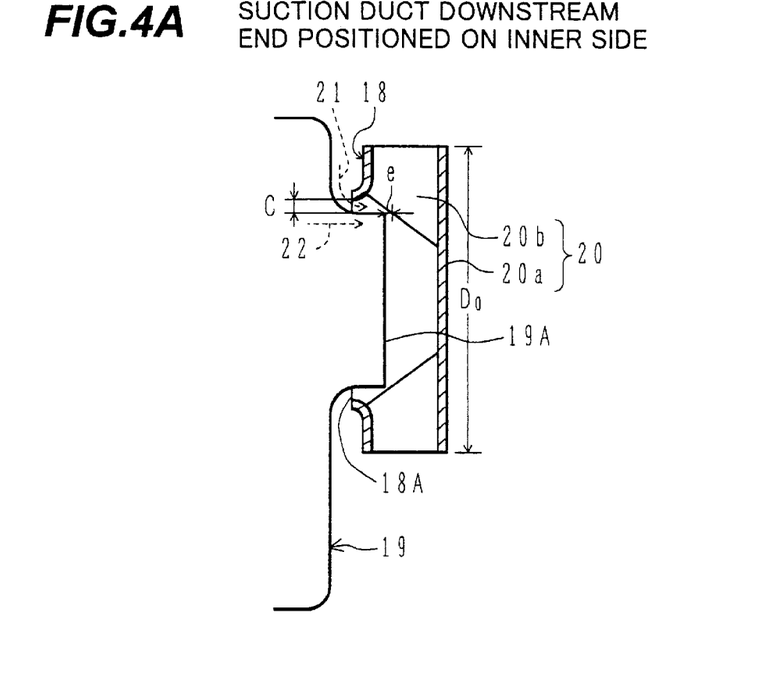
FIG. 4A is a side sectional view showing a detailed arrangement of principal part of an engine cooling system prepared for examining correlation of a noise reducing effect relative to the positional relationship between the suction duct and the rotary shroud.
Figure 4B:
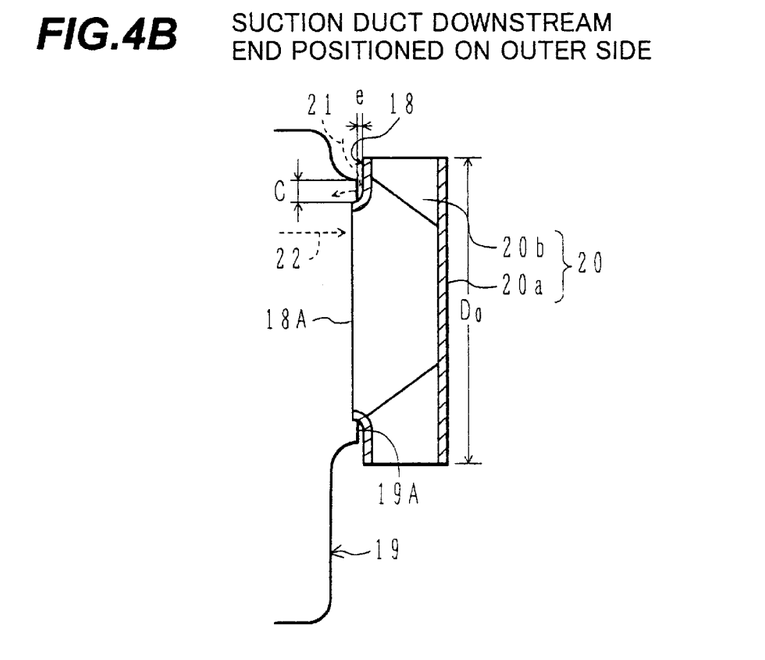
FIG. 4B is a side sectional view showing a detailed arrangement of a principal part of an engine cooling system prepared for examining correlation of a noise reducing effect relative to the positional relationship between the suction duct and the rotary shroud.
Figure 5:
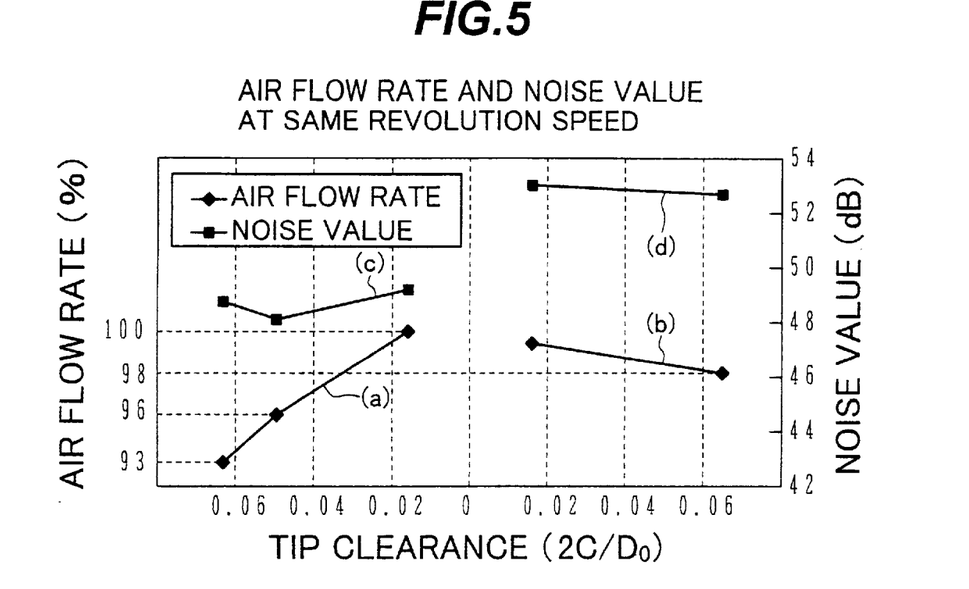
FIG. 5 is a graph showing measured results of a noise value and an air flow rate at the same revolution speed.
Figure 6:
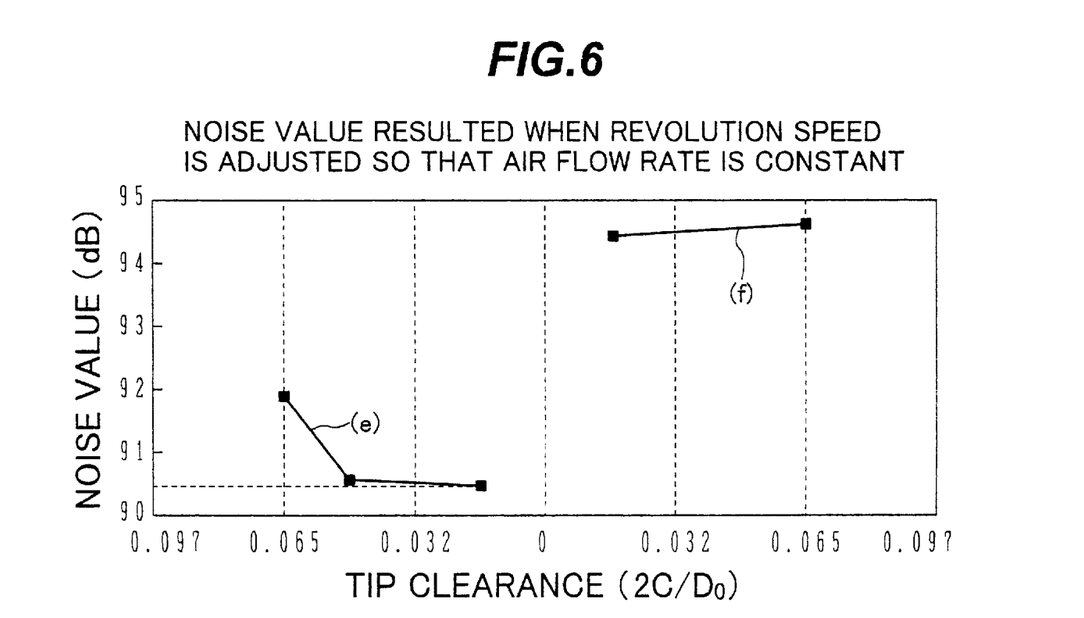
FIG. 6 is a graph showing measured results of a noise value resulted when the revolution speed is adjusted so that the same air flow rate is produced.

For examining correlation of a noise reducing effect relative to the positional relationship between the suction duct and the rotary shroud, the inventors of this application prepared an engine cooling system wherein the suction duct downstream end 19A was positioned inside the rotary shroud suction-side end 18A in overlapped relation as shown in FIG. 4A, and an engine cooling system wherein the suction duct downstream end 19A was positioned outside the rotary shroud suction-side end 18A as shown in FIG. 4B, and then conducted experiments of measuring noise values of both the apparatus at the same revolution speed and noise values of both the apparatus resulted when the revolution speed is adjusted so that the same air flow rate is produced. FIG. 5 shows measured results of the former case and FIG. 6 shows measured results of the latter case. In the graphs of FIGS. 5 and 6, the horizontal axis represents a parameter given by a ratio (2C/Do) of twice a radial clearance (=tip clearance) between the suction duct downstream end 19A and the rotary shroud suction-side end 18A to a fan maximum diameter. Further, the left half in the graph represents the measured values resulted for the structure of FIG. 4A and the right half in the graph represents the measured values resulted for the structure of FIG. 4B. FIG. 5 also shows air flow rates depending on measurement conditions as relative values with the air flow rate resulted at a minimum value of the clearance C being 100%.

In FIG. 5, (a) and (b) represent respectively the results of measuring air flow rates in the structures of FIG. 4A and 4B, whereas (c) and (d) represent respectively the results of measuring noise in the structures of FIG. 4A and 4B. As seen from (a) and (b), with the tip clearance C increasing, the air flow rate is reduced from 100% to 93% in the structure of FIG. 4A and the air flow rate is reduced from 100% to 98% in the structure of FIG. 4B likewise. Thus, in any of the structures, the air flow rate is reduced as the tip clearance C increases. The reasons are that an increase in the clearance C enlarges an amount of air sucked from the outside of the suction duct 19 and hence lowers the fan efficiency in the structure of FIG. 4B represented by (b), and that an effective area on the suction side is reduced in the structure of FIG. 4A represented by (a). Also, at the same revolution speed and the same clearance C, the air flow rate in the structure of FIG. 4A is generally smaller than that in the structure of FIG. 4B. Because of such a difference in air flow rate, as indicated by (c) and (d), noise generated on the condition of having the same revolution speed and the same clearance is smaller in the structure of FIG. 4A where the suction duct downstream end 19A is positioned inside the rotary shroud suction-side end 18A in overlapped relation than in the structure of FIG. 4B where the suction duct downstream end 19A is positioned outside the rotary shroud suction-side end 18A.

Next, FIG. 6 shows the results of measuring a noise level resulted when the revolution speed is adjusted so that the air flow rates in the structures of FIGS. 4A and 4B have no difference, i.e., they are equal to each other. Stated differently, FIG. 6 represents data resulted by increasing the revolution speed in the structure of FIG. 4A relatively over the revolution speed in the structure of FIG. 4B so as to establish the condition of the same air flow rate, and then measuring noise in that condition. In FIG. 6, (e) and (f) represent respectively the results of measuring noise in the structures of FIG. 4A and 4B. At the same revolution speed, as shown in FIG. 5, the air flow rate is reduced in both the structures of FIG. 4A and 4B with the tip clearance C increasing. To hold the same air flow rate, therefore, it is required to increase the revolution speed as the tip clearance C increases. As shown in FIG. 6, however, both (e) and (f) have such a tendency that noise also increases as the clearance C increases.

At this time, as is apparent from comparing (a) and (b) in FIG. 5, the air flow rate in the structure of FIG. 4A is reduced in a larger amount than in the structure of FIG. 4B as the tip clearance C increases. Accordingly, in the measurement for FIG. 6, the revolution speed in the structure of FIG. 4A is generally larger than that in the structure of FIG. 4B. As is apparent from comparing (e) and (f) in FIG. 6, noise is smaller in the structure of FIG. 4A than in the structure of FIG. 4B. The reason is as follows.

In general, a largest part of noise generated from the cooling system of the above-mentioned type is from the impeller 20 of the cooling fan, and a largest part of noise generated from the impeller 20 is from front edges of vanes 20b (inlets of vane). In the structure of FIG. 4B, the direction of a gap flow 21 coming in through radial gaps between the suction duct 19 and the rotary shroud 18 is opposed to the direction of a main flow 22 of cooling air, as indicated by dotted arrows in FIG. 4B, and the flow of the cooling air is greatly disturbed due to eddies or the like in a joining area of both the gap flow and the main flow. A resulting turbulent flow increases noise at the front edges of the vanes 20b. On the other hand, in the structure of FIG. 4A, the direction of a gap flow 21 coming in through radial gaps between the suction duct 19 and the rotary shroud 18 is the same as the direction of the main flow 22 of the cooling air. Accordingly, it is possible to keep the flow of the cooling air from being disturbed due to eddies or the like, and to reduce noise correspondingly.

Further, by positioning the suction duct downstream end 19A inside the rotary shroud suction-side end 18A in overlapped relation like the structure of FIG. 4A, the suction duct 19 can be arranged closer to the rotary shroud 18 than the case of positioning the suction duct downstream end 19A outside the rotary shroud suction-side end 18A like the structure of FIG. 4B on condition that a distance e between the suction duct 19 and the impeller 20 in the axial direction of the fan is set to the same value. This is because, as indicated in FIGS. 4A and 4B, the distance e is given by a distance from the suction duct downstream end 19A to the front edge of the vane 20b in the structure of FIG. 4A, while the distance e is given by a distance from the suction duct downstream end 19A to a wall surface of the rotary shroud 18 in the structure of FIG. 4B. As a result, the engine room 2 can be made more compact corresponding to a difference between both the distances.

In the engine cooling system of this embodiment, as stated above, the suction duct downstream end 19A is positioned inside the rotary shroud suction-side end 18A in overlapped relation similarly to the structure of FIG. 4A. Accordingly, noise can be reduced down to a lower level and the engine room 2 can be made more compact than resulted from the case where the suction duct downstream end 19A is positioned outside the rotary shroud suction-side end 18A.

(C) Actions and Effects Based on Overlap Amount Between Suction Duct and Rotary Shroud As a next step, the inventors of this application have studied the range of an optimum value for an overlap amount d (see FIG. 2) between the suction duct 19 and the rotary shroud 18.

If the overlap amount is less than 0 mm (i.e., negative), the suction duct downstream end 19A and the rotary shroud suction-side end 18A are separated from each other, thus causing the gap flow 21 to come in from the outside of the suction duct 19 in an increased amount and lowering the fan efficiency. Also, the separation of the suction duct downstream end 19A and the rotary shroud suction-side end 18A poses a difficulty in realizing a more compact engine room. Conversely, if the overlap amount d is too large, the suction duct downstream end 19A and the rotary shroud suction-side end 18A are so close to each other and a distance from a joining position of the gap flow 21 and the main flow 22 of the cooling air to the front edge of the vane 20b is so short that flow disturbance caused upon joining of both the gap flow and the main flow adversely affects the performance of the cooling fan, thereby lowering the fan efficiency and increasing noise.

With the above in mind, the overlap amount d is optimally about 20 mm. It is however required to consider manufacturing tolerances and assembly errors in construction machines such as hydraulic excavators because they are each a large welded structure as a whole. In addition, because a body of a construction machine is subject to large vibration when the machine is traveling on a not-flat road surface or during work, it is also required to avoid contact between the suction duct 19 and the rotary shroud 18. In view of those points, an upper limit of the overlap amount d is about 40 mm. Thus, an appropriate range of the overlap amount d between the suction duct 18 and the rotary shroud 19 is $0 \text{ mm} \leq d \leq 40 \text{ mm}$.

In this embodiment, the overlap amount between the suction duct downstream end 19A and the rotary shroud suction-side end 18A in the axial direction is set to d=20 mm so that it is possible to prevent a lowering of the fan efficiency, realize a more compact engine room, and achieve a reduction in noise while allowing manufacturing tolerances and assembly errors.

(D) Actions and Effects Based on Radial Clearance Between Suction Duct and Rotary Shroud As a further step, the inventors of this application have studied the range of an optimum value for the radial clearance C (see FIG. 4A) between the suction duct 18 and the rotary shroud 19.

More specifically, if the clearance C is too large in comparison with the maximum diameter Do of the vane wheel, a proportion of the gap flow 21 joining with the main flow 22 of the cooling air is increased and the efficiency of the cooling fan is lowered (as shown in FIG. 5, for example, the air flow rate is reduced to about 95.5% of the maximum value at 2C/Do≈0.05 and to about 93.5% of the maximum value at 2C/Do≈0.06). Thus, the smaller the clearance C, the higher is the fan efficiency. In the case where the present invention is applied to construction machines such as hydraulic excavators, however, it is required as with the above (3) to consider manufacturing tolerances and assembly errors in construction machines such as hydraulic excavators because they are each a large welded structure as a whole. In addition, it is also required to avoid contact between the suction duct 19 and the rotary shroud 18 even under vibration occurred during work. In view of those points, therefore, an appropriate upper limit of the clearance C is C=0.05 Do. Thus, an appropriate range of the radial clearance C between the suction duct 18 and the rotary shroud 19 is C<0.05 Do.

In this embodiment, the radial clearance between the suction duct downstream end 19A and the rotary shroud suction-side end 18A is set to C=0.03 Do so that it is possible to prevent a lowering of the fan efficiency while allowing manufacturing tolerances and assembly errors.

While a centrifugal fan is employed as the cooling fan 17 in the above embodiment, the present invention is not limited to the above embodiment, and an mixed flow fan may be used instead. This case can also provide similar advantages as mentioned above.

Figure 7:
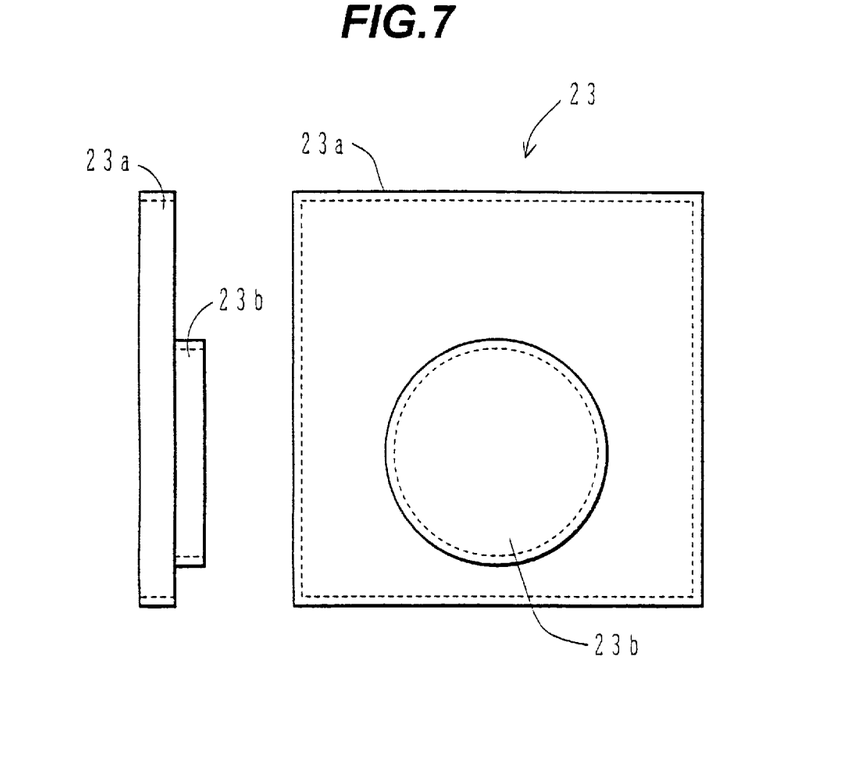
FIG. 7 is a front and side view showing a structure of a suction duct according to a modification.

Further, in the above embodiment, the suction duct 19 is manufactured by, e.g., pressing using a die in order to not only provide the suction duct 19 with such a form as defining a smooth flow passage shape and causing no pressure loss, but also to improve the production efficiency. However, the suction duct 19 is not limited to such a shape, but may be replaced by a suction duct 23 having a simpler shape. This modification of the suction duct will be explained with reference to FIG. 7.

The above-mentioned manufacture method by pressing is effective in high-volume production, but it conversely pushes up a cost in low-volume production because an expensive die is employed. In the case of low-volume production, therefore, the suction duct is modified to have such a simpler structure that a ring member 23b substantially in the form of a circular tube is integrally attached by welding, for example, to a rear wall of a substantially box-shaped introducing plate 23a, as shown in a side and front view of FIG. 7. The suction duct 23 can be manufactured at a relatively inexpensive cost.

According to the present invention, since a rotary shroud is provided on a impeller of a mixed flow fan or a centrifugal fan, cooling air can be produced at a large flow rate and a high pressure without lowering the fan efficiency; hence noise can be reduced. Also, since a suction duct is positioned inside the rotary shroud, it is possible to keep a flow of the cooling air from being disturbed due to eddies or the like in contrast with the case of positioning the suction duct outside the rotary shroud, and to reduce noise correspondingly. Further, since the suction duct and the rotary shroud can be arranged closer to each other on condition that a distance between the suction duct and the impeller in the axial direction of the fan is set to the same value, an engine room can be made more compact correspondingly.

What is claimed is:

1. A construction machine having an engine mounted in an engine room and an engine cooling system including a plurality of heat exchangers comprising a radiator to cool cooling water supplied to said engine and an oil cooler to cool hydraulic fluid supplied to hydraulic actuators, a cooling fan rotated by a rotary shaft driven by a crank shaft of said engine for inducing cooling air to cool said heat exchangers, and a suction duct provided upstream of said cooling fan and downstream of said heat exchanger for introducing said cooling air to the suction side of said cooling fan, said engine cooling system passing said cooling air through in the order of said heat exchangers, said suction duct, said cooling fan, and said engine, wherein:

said cooling fan is one of a mixed flow fan and a centrifugal fan, and includes an impeller provided with a plurality of vanes, and a rotary shroud fixed to said impeller and rotated together with said impeller, said suction duct has a downstream end in the form of a cylinder, an opening diameter of said downstream end is smaller than an opening diameter at a suction-side end of said rotary shroud, said suction duct is arranged such that said downstream end is positioned inside the suction-side end of said rotary shroud in overlapped relation in such a manner that said downstream end is substantially parallel to said suction-side end, and an overlapping amount between the downstream end of said suction duct and the suction-side end of said rotary shroud in the axial direction is not less than 0 mm, but not more than 40 mm.

2. A construction machine according to claim 1, wherein assuming that a radial clearance between the downstream end of said suction duct and the suction-side end of said rotary shroud is C and a maximum diameter of said impeller is Do, the following relation is satisfied:

C≦0.05≦Do.

3. A construction machine according to claim 1, wherein said suction duct comprises a substantially box-shaped introducing plate and a ring member being substantially in the form of a circular tube and integrally formed on a rear wall of said introducing plate, said ring member constituting the downstream end of said suction duct.

* * * * *